US011261053B2

(12) United States Patent
Vuorenala et al.

(10) Patent No.: US 11,261,053 B2
(45) Date of Patent: Mar. 1, 2022

(54) GENERATION OF A CONTROL SIGNAL TO A CONVEYOR SYSTEM

(71) Applicant: KONE Corporation, Helsinki (FI)

(72) Inventors: Jere Vuorenala, Helsinki (FI); Niko Elomaa, Helsinki (FI)

(73) Assignee: KONE CORPORATION, Helsinki (FI)

( * ) Notice: Subject to any disclaimer, the term of this patent is extended or adjusted under 35 U.S.C. 154(b) by 243 days.

(21) Appl. No.: 16/506,626

(22) Filed: Jul. 9, 2019

(65) Prior Publication Data

US 2020/0039754 A1 Feb. 6, 2020

(30) Foreign Application Priority Data

Aug. 3, 2018 (EP) .................................... 18187275

(51) Int. Cl.
| | | |
|---|---|---|
| *B66B 1/24* | (2006.01) | |
| *B66B 1/46* | (2006.01) | |
| *G05B 19/418* | (2006.01) | |
| *B25J 9/00* | (2006.01) | |
| *B25J 9/16* | (2006.01) | |
| *B65G 43/10* | (2006.01) | |

(52) U.S. Cl.
CPC ........... *B66B 1/2408* (2013.01); *B25J 9/0093* (2013.01); *B25J 9/1679* (2013.01); *B66B 1/468* (2013.01); *G05B 19/4182* (2013.01); *G05B 19/41865* (2013.01); *B65G 43/10* (2013.01); *B66B 2201/104* (2013.01); *B66B 2201/21* (2013.01)

(58) Field of Classification Search
CPC . B66B 1/468; B66B 2201/104; B66B 1/2408; B25J 9/1679
See application file for complete search history.

(56) References Cited

U.S. PATENT DOCUMENTS

| | | | |
|---|---|---|---|
| 9,701,012 B1 | 7/2017 | Theobald | |
| 2006/0265103 A1* | 11/2006 | Orita | .................... G05D 1/0278 700/245 |
| 2012/0041593 A1* | 2/2012 | Ichinose | ............... B66B 1/2458 700/258 |
| 2017/0285635 A1* | 10/2017 | Sisbot | ................ G01C 21/3407 |
| 2019/0345000 A1* | 11/2019 | Park | ........................ B66B 1/461 |
| 2020/0180903 A1* | 6/2020 | Aberg | .................... B66B 5/0012 |

FOREIGN PATENT DOCUMENTS

JP 2001171918 A * 6/2001 ............... B66B 1/14

OTHER PUBLICATIONS

European Search Report of application 18 18 7275 dated Feb. 5, 2019.

* cited by examiner

*Primary Examiner* — Thomas Randazzo
(74) *Attorney, Agent, or Firm* — Birch, Stewart, Kolasch & Birch, LLP

(57) ABSTRACT

A method for generating a control signal to a conveyor system, the conveyor system configured to serve at least a plurality of robots, includes receiving, in a control entity, a service call for a first robot, the service call being associated with a priority of the first robot; determining, by the control entity, the priority of the first robot; and generating, by the control entity, a control signal to the conveyor system to serve the service call for the first robot in accordance with the determined priority of the first robot. A control entity, a robot and a system are also provided.

12 Claims, 3 Drawing Sheets

| TASK | PRIORITY |
|---|---|
| A | 2 |
| B | 1 |
| C | 3 |
| A+B | 2 |
| A+B+C | 1 |

GENERATION OF A CONTROL SIGNAL TO A CONVEYOR SYSTEM

TECHNICAL FIELD

The invention concerns in general the technical field of conveyor systems. More particularly, the invention concerns a control of a conveyor system.

BACKGROUND

Conveyor systems, like elevators, are configured to serve users by conveying the users from one position to another, such as from one floor to another floor in a building. The conveyor system is typically configured to carry human passengers and the conveyor systems are mainly developed for that purpose. Due to human character many parameters of the conveyor system, and thus functionalities, to serve the human passengers need to be considered from the user experience point of view. This kind of parameters may e.g. relate to waiting/service time of the human passengers with the conveyor system.

On the other hand, a technical development in other technical areas have enabled a development of at least partially autonomous devices to operate within an area or a space. The at least partially autonomous device may refer to robots, such as mobile robots, which may travel e.g. in a controlled manner within the area or the space. The robots may be configured to cooperate with other devices and/or systems, such as with the conveyor systems as described. The cooperation may e.g. refer to a communication in one way or another between the mentioned entities. Moreover, one entity may utilize services of the other entity. For example, the robot may travel with the conveyor system from one position to another. For example, the robot may be configured to enter an elevator car and communicate with the conveyor system in such a manner that the conveyor system carries the robot from one floor to a destination floor.

The cooperation between the conveyor systems and the robots have established further challenges in order to serve the passengers, being they either human passengers or robot passengers, in a manner that satisfy the need. For example, the robots, as passengers, do not have any similar characters to humans where e.g. waiting for a service causes frustration. However, the existing conveyor systems do not take into account the needs of different kinds of passengers and, hence, there is need to develop solutions which may mitigate at least in part drawbacks of the existing solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a control entity, a robot and a system for generating a control signal to a conveyor system.

The objectives of the invention are reached by a method, a control entity, a robot and a system as defined by the respective independent claims.

According to a first aspect, a method for generating a control signal to a conveyor system is provided, the conveyor system is configured to serve at least a plurality of robots, the method comprising: receiving, in a control entity of the conveyor system, a service call for a first robot, the service call is associated with a priority of the first robot; determining, by the control entity of the conveyor system, the priority of the first robot; and generating, by the control entity of the conveyor system, a control signal to serve the received service call for the first robot in accordance with the determined priority of the first robot.

A generation of the control signal may comprise: determining a priority of at least one other passenger indicated in at least one other service call pending in the conveyor system; comparing the determined priority of the at least one other passenger to the priority of the first robot; setting the generated control signal to cause the conveyor system to serve the received service call carrying the indication of the priority of the first robot in accordance with a priority order of the compared priorities of the first robot and the at least one other passenger.

The priority of a robot may be dependent on a task defined for the robot. The task may be defined in response to at least one of the following: an interaction over a user interface of the robot, the interaction generating an operational instruction for the robot, an internal processing of data by the robot. Moreover, the interaction may be performed with at least one of the following: the user interface implemented with at least one input/output device in the robot, the user interface establishing a wireless communication interface in the robot.

The service call may be received from at least one of the following: a robot, a data center, a control entity, a user terminal.

According to a second aspect, a control entity of a conveyor system is provided, the control entity comprising: at least one processor; at least one memory including computer program code; the at least one memory and the computer program code configured to, with the at least one processor, cause the control entity to perform: receive a service call for a first robot, the service call is associated with a priority of the first robot; determine the priority of the first robot; and generate a control signal to serve the received service call for the first robot in accordance with the determined priority of the first robot.

The control entity may be configured to perform a generation of the control signal by: determining a priority of at least one other passenger indicated in at least one other service call pending in the conveyor system; comparing the determined priority of the at least one other passenger to the priority of the first robot; setting the generated control signal to cause the conveyor system to serve the received service call carrying the indication of the priority of the first robot in accordance with a priority order of the compared priorities of the first robot and the at least one other passenger. The control entity may be configured to receive the service call from at least one of the following: a robot, a data center, a control entity, a user terminal.

According to a third aspect, a robot is provided, the robot comprising: at least one processor; at least one memory including computer program code; the at least one memory and the computer program code configured to, with the at least one processor, cause the robot to perform: generate a service call to a control entity of a conveyor system, the service call is associated with a priority of the first robot.

The robot may be configured to generate the service call in response to at least one of the following: an interaction over a user interface of the robot, a communication interface of the robot, an internal processing of data by the robot.

According to fourth aspect, a system is provided, the system comprising: a conveyor system comprising a control entity, and a plurality of robots; in the system: a service call for a first robot among the plurality of robots is received in the control entity of the conveyor system, the service call is associated with a priority of the first robot; the priority of the first robot is determined by the control entity; and a control signal is generated, by the control entity, to serve the received service call for the first robot in accordance with the determined priority of the first robot.

The service call may be generated by at least one of the following: the first robot, a data center, the control entity, a user terminal.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figures 1, 3:
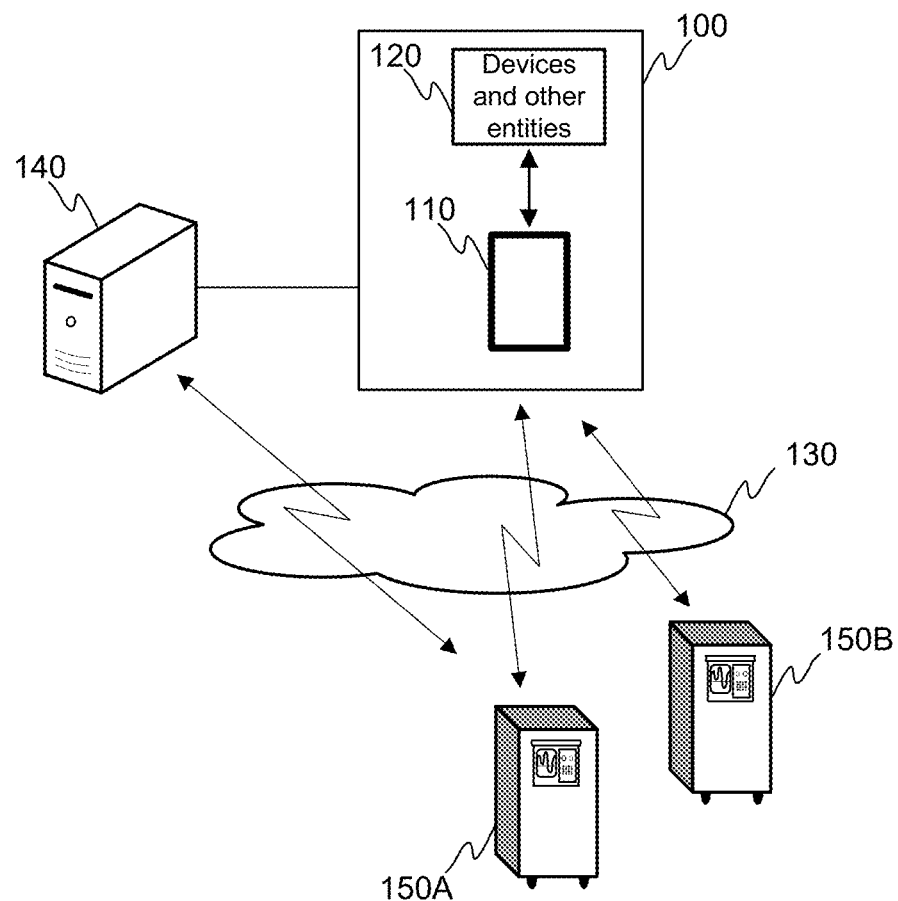
FIG. 1 schematically illustrates a system according to an embodiment of the invention.
FIG. 3 schematically illustrates an example of a data record according to an embodiment of the invention.

FIG. 1 illustrates schematically an example of a system in which the present invention may be applied to. The system may comprise a conveyor system 100 and a plurality of robots 150A, 150B communicatively coupled to each other e.g. over a wireless communication network 130. The conveyer system 100 may comprise a control entity 110 and devices and other entities 120 controlled at least in part by the control entity 110. In case the conveyor system 100 is an elevator system the control entity 110 may e.g. be an elevator controller and the devices and other entities 120 may comprise, as non-limiting examples, drive circuit and devices, safety circuit and devices, sensors, elevator call devices, elevator door, elevator cars and similar depending on a type of the elevator system. Moreover, the conveyor system may comprise a communication interface e.g. implemented in the control entity 110 for communicating at least with the robots 150A, 150B e.g. in a wireless manner. The communication interface may e.g. implement a short-range wireless communication, wide-range wireless communication or communication implemented through a physical connection, such as in a wired manner. Further, the conveyor system 100 and/or at least one of the robots 150A, 150B may be communicatively coupled to a data center 140, which may be configured to cooperate with at least one of the mentioned entities. For example, it may monitor and control an overall operation of the system, or any entities therein, and be involved in functionalities of the system at least in some embodiments of the invention. The data center may be implemented with one or more computing devices, such as servers, operating in centralized or distributed manner e.g. as a cloud computing environment. The data center 140 may be communicatively coupled either directly or indirectly to the other entities, such as to the conveyor system 100 or to the robots 150A, 150B in a wireless or a wired manner, e.g. by utilizing a wireless communication network 130.

Generally speaking the above mentioned control entity 110 shall be understood as any implementation with one or more control devices, such as computers or servers, by means of which a control function may be implemented. As mentioned, the control entity may refer to an elevator controller as a non-limiting example. It may also be implemented in a distributed manner e.g. as a cloud computing environment. In some implementation the control function, i.e. the task of the control entity 110, may be established in the data center 140.

The robot 150A, 150B may in this context be understood as a machine capable of carrying out actions automatically, at least in part, or in response to an input provided to the robot 150A, 150B in any manner. Moreover, the robot 150A, 150B may comprise means for enabling it to be mobile within the area it operates, such as in the location of the conveyor system 100. The means for enabling the mobility may refer to power generating means, such as an electric motor receiving its power from a battery located in the robot 150A, 150B. Additionally, the robot 150A, 150B may comprise means of transport, such as a drive shaft and a number of tyres, or similar, into which the power is brought from the electric motor. The means for enabling the mobility as described above is a non-limiting example and any other means enabling the robot 150A, 150B being mobile may be applied to. Moreover, the robot 150A, 150B may comprise computing resources for controlling an operation of the robot 150A, 150B. Moreover, the robot 150A, 150B may comprise a communication interface through which the robot 150A, 150B may be communicatively coupled to one or more external entities to the robot 150A, 150B. According to an embodiment the robot 150A, 150B may be configured to communicate, either directly or indirectly, with the control entity 110 of the conveyor system 100. The communication interface may be configured to implement a communication technique enabling the communication with control entity 110 through the communication interface implemented in the conveyor system 100. The robot 150A, 150B may also be equipped with a number of sensors. The sensors may e.g. obtain information on the environment. An example of the sensors may e.g. be sensors obtaining position information broadcast e.g. from an applicable positioning system, such as from an indoor positioning system. The positioning of the robot 150A, 150B may also be based on a transmitter arranged in the robot 150A, 150B, which transmitter is configured to transmit a signal detected by one or more receivers arranged in the area and on the basis of the detected signal the position of the robot 150A, 150B may be derived. Still further, the robot 150A, 150B may comprise a user interface e.g. comprising I/O devices, such as buttons, keyboard, touch screen, microphone, loudspeaker, display and so on, for receiving input and outputting information. The I/O devices may also refer to sensors mentioned earlier or the communication interface through which the user interface may be arranged. For giving an example of the input given to a robot 150A, 150B may e.g. be an indication on a need to use the elevator, i.e. giving an elevator call through the robot 150A, 150B, which indication may be signaled from the robot 150 to the elevator controller 110. Alternatively or in addition, the input given to a robot may indicate an operational instruction, such as a control request, for performing a task by the robot 150A, 150B.

For a purpose of describing some further aspects of the invention it is hereby assumed the robots 150A, 150B may access the conveyor system 100 at least in a manner that they may request service from the conveyor system 100, but also enter the conveyor device configured to operate as a platform for transporting the passengers, such as the robots 150A, 150B. For example, if an elevator system is operating as the conveyor system 100 the robots 150A, 150B may enter elevator cars belonging to the conveyor system 100 for being served by the elevator system. Moreover, the service call at least for the robots 150A, 150B may be generated by some other entity, such as a data center 140 or the control entity 110 on its own motion, or from a user terminal, such as from a mobile phone or similar, or even from another robot 150A, 150B.

Figure 2:
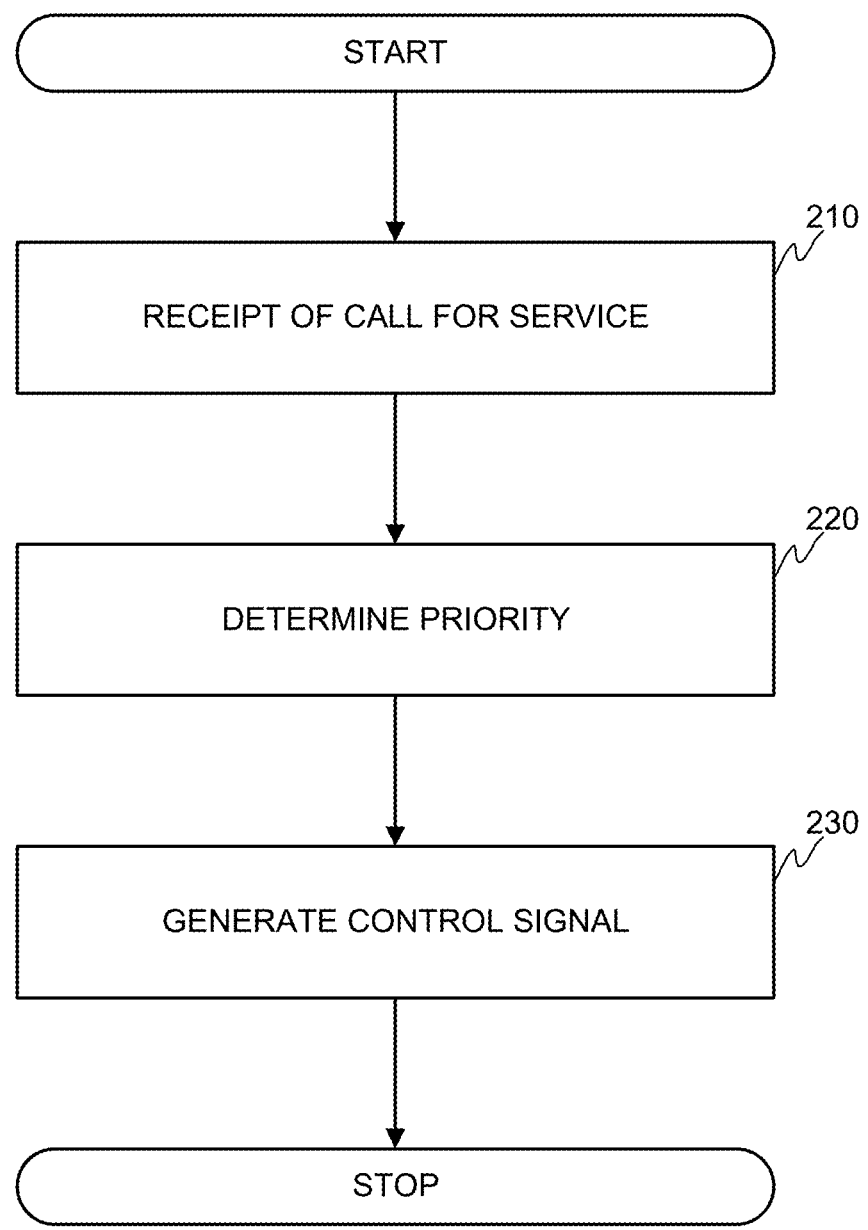
FIG. 2 schematically illustrates an example of a method according to an embodiment of the invention.

Next, in view of above some further aspects with respect to the invention are described by referring to FIG. 2 disclosing an example of a method according to an embodiment of the invention. The method may start when the control entity 110 of the conveyor system 100 receives a service call indicating a request for a service provided by the conveyor system 100. The service call advantageously indicates the party needing the service which in the present case may be a first robot 150A. The service call may originate from any entity capable of providing the service call either on its own behalf or on behalf of another entity. However, typically the service call may originate from the robot 150A, 150B, i.e. the first robot 150A itself, through a communication between the first robot 150A and the control entity 110. On the other hand, the service call may be initiated by the data center 140 so that it generates the service call either directly to the control entity 110 or through the first robot 150A to the control entity 110. In the previous case the data center 140 may also be configured to communicate with the first robot 150A for providing information relating to the service call, such as providing a task to the first robot 150A or instructing the first robot 150A to a predetermined position and so on. In any case, the service call received by the control entity 110 requesting a service for the first robot 150A may be associated with a priority of the first robot 150A. The association of the priority may e.g. be implemented so that the service call itself comprises, and thus carries, an indication of the priority of the first robot. Alternatively or in addition, the priority information may be delivered to the control entity 110, or obtained by the control entity 110 through a communication with another entity, such as with the data center 140 as a non-limiting example. In case the priority information is delivered separately to the service call the association between these two may be implemented e.g. with a predefined identifier included in the both pieces of communication i.e. the service call and the priority data. In other words, the priority of the first robot 150A may e.g. be expressed with data included in the corresponding communication, the data representing the assigned priority to the first robot 150A. Advantageously, the system is implemented so that there are defined at least two priorities for representing a priority order for indicating mutual priorities between the plurality of robots 150A, 150B when the priority is assigned individually to the robots, or to a plurality of robots as a group. The priority assigned to the robots 150A, 150B may e.g. be dependent on a task defined for the robots 150A, 150B. In other words, the entity defining the priority to the robots may store and maintain a data structure defining the tasks and the priorities of the task. A non-limiting example of such a data structure is illustrated in FIG. 3. As may be seen from FIG. 3 the system may assign the following tasks to the robots 150A, 150B: A, B, C, A+B and A+B+C. Correspondingly, their priorities may be: 2, 1, 3, 2, 1. The data in the data structure may be static or it may be updated dynamically e.g. in response to a status of service load. The task may be defined in response to an interaction over a user interface of the robot in question or through any interaction generating an operational instruction for the robot in question. In other words, a human being may interact with the robot 150A, 150B through a user interface and indicate a task to the robot 150A, 150B, for instance. Alternatively or in addition, the interaction may be implemented through the communication interface implemented in the robot 150A, 150B wherein the operational instruction is communicated to the robot 150A, 150B. This may e.g. be initiated by the data center 140 or by a human being who may e.g. interact with the robot 150A, 150B with a user equipment, such as a mobile terminal, or it may be provided by any other entity, such as the control entity as a non-limiting example. In case of it is the data center 140 who provides the operational instruction at least to the robot 150A, 150B it may also indicate the priority in the same signaling. Alternatively or in addition, the robots 150A, 150B maintain the data structure as indicated and they determine the priority in response to the receipt of the task for including it to the service call, as discussed above. In other words, the task may be received by the robots 150A, 150B from an external entity or person to the robot 150A, 150B or derived internally by the robot 150A, 150B by utilizing predetermined rules and data in the derivation. For concluding the step 210 as illustrated in FIG. 2 the control entity receives a service request associated with a priority information assigned to the robot 150A, 150B which is to be served.

In some implementation of the invention the service call and the associated priority information may originate from different sources and/or being accessible at different instants of time. For example, a service call may be delivered at a first instant of time comprising e.g. an instant of time when the service from the conveyor system is needed. However, the priority information may be published, e.g. in the described manner through delivery of information or obtaining the information e.g. from data storage, at a second instant of time e.g. being close to the instant of time the service is needed.

Next, the control entity 220 is configured to determine the priority associated to the received service call for serving the first robot 150A with the conveyor system 100. The determination refers at least to an operation in which the priority data is derived either directly or indirectly from the service call in question. This may refer to an implementation in which the party transmitting the service call may define the priority and include it to the service call as such or associate it to the service call e.g. by storing data on the priority and delivering it separately to the service call or providing it accessible to the control entity. Alternatively or in addition, the service call and the priority data associated to the service call, which may be analyzed by the control entity 110 and in response to the analysis the control entity 110 may define the priority to the robot in question. Moreover, the control entity 110 may be configured to derive further information from the service call, such as an identifier of the robot 150A, 150B. It is worthwhile to mention that the priority may be directly expressed in the priority data or the priority data may comprise any other type of data, such as some raw data, from which the priority may be derived by processing the raw data in a predetermined manner by any entity.

In response to the determination of the priority of the first robot 150A the control entity 110 may be configured to generate a control signal 230 to the conveyor system 100 to serve the call received for serving the first robot 150A in accordance with the determined priority of the first robot 150A. The generation of the control signal 230 may comprise a step in which it is determined at least one other service call pending in the conveyor system 100 and specifically in the control entity 110 managing the service calls. Hence, the control entity 110 may be configured to determine a priority of at least one second robot 150B indicated in the at least one other service call pending in the conveyor system 100 and compare the determined priority of the at least one second robot 150B to the priority of the first robot 150A. In response to the comparison the control entity 110 of the conveyor system 100 may be configured to set the generated control signal to cause the conveyor system 100 to serve the received service call carrying the indication of the priority of the first robot 150A in accordance with a priority order of the compared priorities of the first robot 150A and the at least one second robot 150B or a priority of any other user of the conveyor system 100 whose service call is pending in the conveyor system 100. For example, some of the pending service calls may relate to a transport of a human passenger to whom the conveyor system 100 may be configured to generate a priority overruling any service calls of the robots 150A, 150B. In other words, the control entity 110 may generate an instruction to the conveyor system 100 to serve the first robot 150A either before one or more other passengers, such as the second robot 150B, or after the one or more other passengers, such as the second robot 150B, in accordance with the priority order. In some embodiment of the invention, the both robots 150A, 150B may also be served concurrently even with human passengers by the conveyor system 100 if the priorities equal to each other, and some other parameters are fulfilled. For example, the robots 150A, 150B may have received a task which may be performed at the same position or at the same floor which allows the conveyor system 100 to transport the robots 150A, 150B concurrently. Generally speaking the above given examples of managing the service calls are non-limiting examples and an existing plan for serving the service call may be updated or even replaced at any instant of time e.g. based on some predetermined rules. The service plan may e.g. be updated or replaced as a whole or in part.

Figure 4:
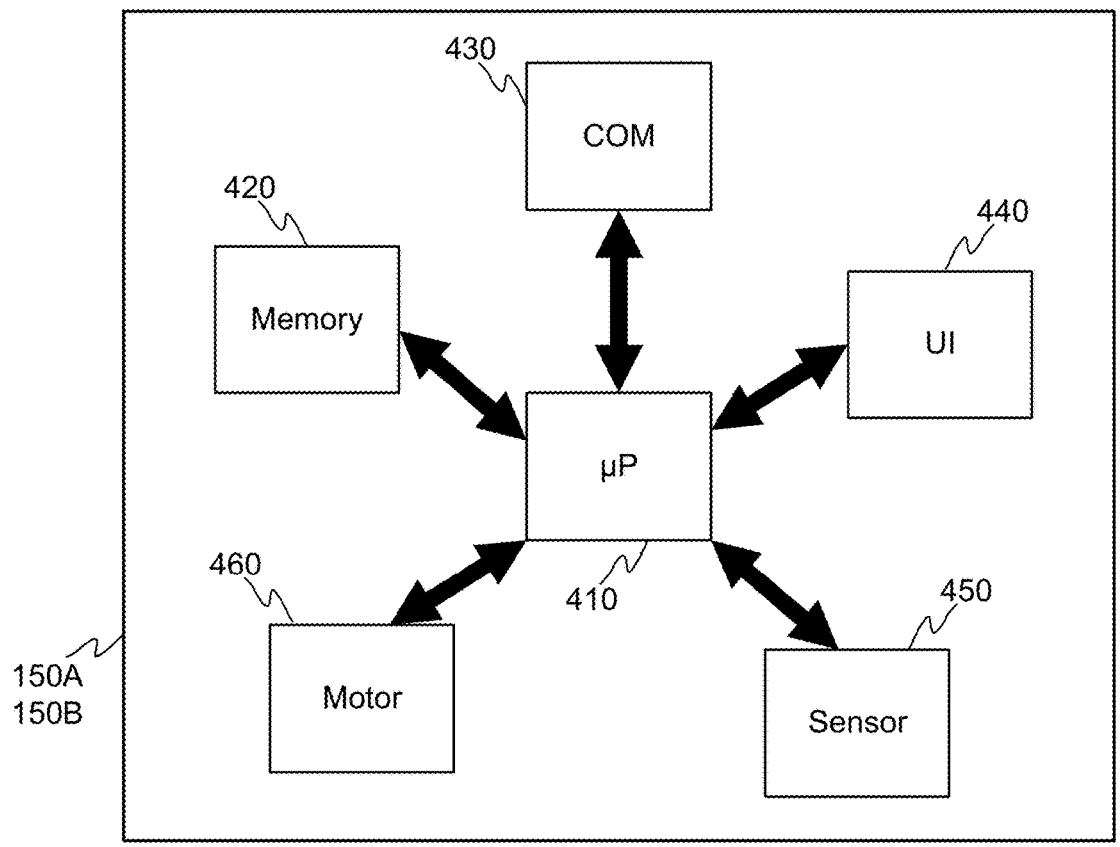
FIG. 4 schematically illustrates an example of a robot according to an embodiment of the invention.

FIG. 4 schematically illustrates an example of a robot 150A, 150B belonging to a system according to an embodiment of the invention. The robot 150A, 150B may comprise at least the following entities: processing unit 410, memory unit 420, communication interface 430, user interface (UI) 440, sensor unit 450 and motor unit 460. The mentioned entities may comprise one or more operating units, e.g. one or more microprocessors or similar, one or more memories, one or more communication devices, such as modems, one or more user interface devices, one or more sensors and one or more motors. In addition to the mentioned entities the robot 150A, 150B may comprise further devices and entities, such as batteries for storing energy to be used by the other entities. The entities belonging to the robot 150A, 150B may be communicatively coupled to each other with e.g. a communication bus. The processing unit 410 may be configured to control the operation of the robot 150A, 150B as well as communication with any external entity, such as with a data center 140, a control entity 110, other robots, or other entities. The communication may be performed e.g. in a wireless manner. The users of the conveyor system 100 may provide input through the user interface unit 440 with the robot 150A, 150B and the robot may, under control of the processing unit 410, output information, such as prompting, to the user. The sensors may comprise any sensors by means of which the robot 150A, 150B may obtain information on an environment, but also the sensor unit 450 may comprise sensors enabling positioning and/or navigation within the location. The processing unit 410 may also be configured to generate control signals to the motor unit 460 in order to make the robot 150A, 150B to move. Moreover, the robot 150A, 150B may comprise means enabling the robot to be mobile, such as the transport means as described earlier. The operation of the processing unit 410 may be achieved by executing portions of computer program code stored e.g. in the memory unit 420 for generating the control signals and, thus, causing the robot 150A, 150B to operate in the manner as described. The memory unit 420 may also be used for storing obtained and received information together with any other data either permanently or temporarily. In some non-limiting embodiment the robot 150A, 150B may be configured so that the user interface is disabled in response to a receipt of an input from a user in order to enable the robot to perform the task requested by the user. In this manner no other user may input other request when the first request is served by robot 150A, 150B in question.

Figure 5:
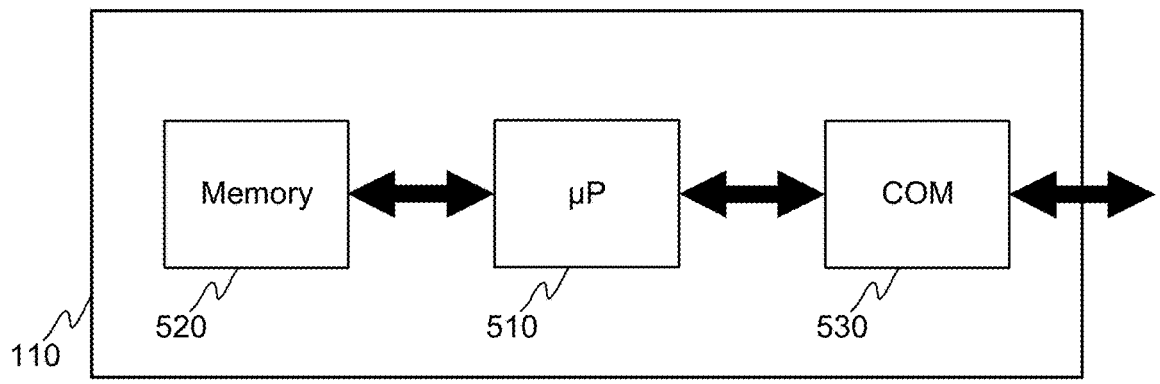
FIG. 5 schematically illustrates an example of a control entity according to an embodiment of the invention.

FIG. 5 schematically illustrates an example of a control entity 110 of the conveyor system 110 which is configured to communicate with at least a plurality of mobile robots 150A, 150B and other entities of the conveyor system 100 either directly or indirectly. In some embodiment of the invention the control entity 110 may be configured to communicate also with a data center 140 and other devices e.g. controlling the robots 150A, 150B. The control entity 110, when implemented as a single controller or control unit, may comprise a processing unit 510 comprising one or more processors, a memory unit 520 comprising one or more memories and a communication interface 530 comprising one or more communication devices, such as modems or other devices. Advantageously, the memory unit 520 may store portions of computer program code and any other data, and the processing unit 510 may cause the control entity 110 to operate as described by executing at least some portions of the computer program code stored in the memory unit 520. As mentioned earlier the control entity 110 may also comprise a plurality of devices, such as the one schematically illustrated in FIG. 5, configured to operate together for establishing the control function as described.

In the description of some aspects of the invention above it is mentioned that at least one other service call pending in the conveyor system 100 is taken into account for generating the control signal 230. According to an embodiment the conveyor system 100 may comprise a register implemented e.g. in a memory unit in which it is maintained all pending i.e. active service calls. As non-limiting examples of pending service calls may be mentioned all service calls which the conveyor system 100 has not fully served. In such an embodiment a service call is maintained in the register until the service is completed. However, in some other embodiment it may be arranged that the pending service call only refers to those service calls which are not assigned to the conveyor system 100. An example of this kind of situation may be that an elevator system, as the conveyor system 100, has not assigned an elevator car to serve a certain service call.

In some embodiment of the system and the method as described the human passengers may be taken into account in a specific manner. For example, due to human characters it may be arranged that they have a specific priority class which is only allowed to be assigned to human passengers and, thus, included in the service call whose aim is to get service from the conveyor system 100 for human passengers. In other words, the control entity 110 may be configured to allocate conveyor system 100 to serve those prior to any other service call generated for serving the robots 150A, 150B by the conveyor system 100.

In the description of at least some embodiments of the invention it is disclosed that the system may comprise the data center 140 being involved in the solution according to at least some embodiments of the invention. The data center shall be in this context be understood as a standalone device, such as a server, or a distributed computing resource (cloud computing) implemented with a plurality of devices. The data center and at least part of the devices belonging to it may reside distant to the space into which the system is implemented or locally in the space. Moreover, the system according to the invention may comprise further computing device configured to implement a predetermined task. For example, there may be a device residing locally in the space which is configured to control an operation of the robots 150A, 150B at least in part. In such an implementation the communication path may be arranged accordingly between the conveyor system 100 and the robots 150A, 150B through the device.

Still further, in the description of at least some aspects of the present invention it is indicated that the priority assigned to the robot 150A, 150B, and possibly to other passengers, is dependent on a task assigned to the robot 150A, 150B in question. The concept of "task" shall in the context of the present invention be understood in a broad manner at least to cover an actual task the robot is instructed to perform but also it may represent an impact to a service load caused to the conveyor system. In this manner the priority may be provided, and which may then be used to setting an optimal timing to serve the robot in question by the conveyor system. Also, in an embodiment the robot 150A, 150B may be configured to obtain information on a status of allocation of service calls e.g. by communicating with the control entity 110 of the conveyor system and if the robot 150A, 150B is configured to determine the priority e.g. in view of the caused service load to the conveyor system 100 it may optimize an instant of time when the service call is generated to the control entity 110 by the robot. In other words, the robot 150A, 150B may be configured to analyze an optimal situation for generating the service call to the conveyor system 100.

In the description of at least some aspects of the invention it is mainly referred that the users in addition to the robots are human passengers. Naturally, there may be other kind of use cases for the conveyor system. Hence, the term passenger in the context of the present invention shall be understood to cover at least people, pets, cargo and any similar.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating a control signal to a conveyor system, the conveyor system configured to serve at least a plurality of robots, the method comprising:
    obtaining information regarding a status of allocation of service calls to the conveyor system;
    determining a time to generate a first service call to the conveyor system based on a service load caused to the conveyor system based on the information and a task a first robot among the plurality of robots is to complete;
    generating, by the first robot among the plurality of robots, the first service call based on the determined time;
    receiving, in a control entity of the conveyor system, a plurality of service calls, the plurality of service calls including the first service call and at least one passenger having a service call separate from the first service call;
    determining, by the control entity of the conveyor system, a priority of the services calls; and
    generating, by the control entity of the conveyor system, a control signal serving the received service calls in accordance with the determined priority.

2. The method of claim 1, wherein the service calls are received from at least one of the following:
    a robot, a data center, a control entity, and a user terminal.

3. The method of claim 1, wherein the priority of the service calls is dependent on a task defined for a respective robot among the plurality of robots.

4. The method of claim 3, wherein the service calls are received from at least one of the following:
    a robot, a data center, a control entity, and a user terminal.

5. The method of claim 3, wherein each task is defined in response to at least one of the following:
    an interaction over a user interface of the respective robot, the interaction generating an operational instruction for the respective robot, and
    an internal processing of data by the respective robot.

6. The method of claim 5, wherein the service calls are received from at least one of the following:
    a robot, a data center, a control entity, and a user terminal.

7. The method of claim 5, wherein the interaction is performed with at least one of the following:
    the user interface implemented with at least one input/output device in the respective robot, and the user interface establishing a wireless communication interface in the respective robot.

8. The method of claim 7, wherein the service calls are received from at least one of the following:
    a robot, a data center, a control entity, and user terminal.

9. A robot comprising:
    at least one processor; and
    at least one memory including computer program code,
    wherein the at least one memory and the computer program code are configured to, with the at least one processor:
    obtain information regarding a status of allocation of service calls to a conveyor system, determine a time to generate a service call to the conveyor system based on a service load caused to the conveyor system based on the information and a task the robot is to complete, and cause the robot to aggregate the service call to a control entity of a conveyor system, the service call being associated with a priority of the robot and based on the determined time.

10. The robot of claim 9, wherein the robot is configured to generate the service call in response to at least one of the following: an interaction over a user interface of the robot, a communication interface of the robot, and an internal processing of data by the robot.

11. A system comprising:
a conveyor system comprising a control entity; and
a plurality of robots,
wherein the system is configured to:
obtain information regarding a status of allocation of service calls to the conveyor system,
determine a time to generate a first service call to the conveyor system based on a service load caused to the conveyor system based on the information and a task a first robot among the plurality of robots is to complete, and
cause the first robot to generate the first service call based on the determined time,
wherein a plurality of service calls, including the first service call and at least one passenger having a service call separate from the first service call, is received in the control entity of the conveyor system,
wherein the priority of the plurality of services calls is determined by the control entity, and
wherein a control signal is generated, by the control entity, to serve the received service calls in accordance with the determined priority.

12. The system of claim 11, wherein the service call is generated by at least one of the following: the first robot, a data center, the control entity, and a user terminal.

* * * * *